April 23, 1968 J. O. SINNIGER 3,379,865

DIGITAL SQUARER FOR SUMMING THE SQUARES OF SEVERAL NUMBERS BY ITERATIVE ADDITION

Filed Oct. 5, 1965 3 Sheets-Sheet 1

INVENTOR.
JOSEPH O. SINNIGER

BY Arthur J. Bowers
AGENT
John M. Pease
ATTORNEY

INVENTOR.
JOSEPH O. SINNIGER
BY Arthur L. Bowers
AGENT
John M. Pease
ATTORNEY

April 23, 1968 J. O. SINNIGER 3,379,865

DIGITAL SQUARER FOR SUMMING THE SQUARES OF SEVERAL NUMBERS BY ITERATIVE ADDITION

Filed Oct. 5, 1965 3 Sheets-Sheet 3

INVENTOR.
JOSEPH O. SINNIGER

BY Arthur L. Bowers
AGENT
John M. Pean
ATTORNEY

United States Patent Office 3,379,865
Patented Apr. 23, 1968

3,379,865

DIGITAL SQUARER FOR SUMMING THE SQUARES OF SEVERAL NUMBERS BY ITERATIVE ADDITION

Joseph O. Sinniger, Pennington, N.J., assignor, by mesne assignments, to the United States of America as represented by the Secretary of the Navy Filed Oct. 5, 1965, Ser. No. 493,282
1 Claim. (Cl. 235—168)

ABSTRACT OF THE DISCLOSURE

Squaring any one or two or three digit decimal numbers is effected by storing the digits of that number, hereinafter designated multiplicand, in binary coded decimal units for the units, tens, and hundreds digits respectively of the multiplicand. An accumulation having six binary coded decimal units stores the units, tens, hundreds, thousands, ten-thousands and hundred thousands digits respectively of the multiplicand squared. When the square circuit is activated a clock operated timer circuit controls the transfer of the multiplicand to the ten-thousands, thousands, and hundreds binary coded decimal units respectively that number of times equal to the hundreds digit of the multiplicand, for iterative addition. Carry function is performed as needed. Then the timer circuit controls the transfer of the multiplicand to the thousands, hundreds, and tens binary coded decimal units respectively that number of times equal to the tens digit of the multiplicand and after that the transfer of the multiplicand to the hundreds, tens, and units binary coded decimal units respectively that number of times equal to the units digit of the multiplicand. Then the squarer circuit is deactivated. Additional binary coded decimal units are included in the accumulator for higher order digits than the hundred thousand digit to enable the summing of successively squared multiplicands.

This invention relates to squaring a number in any radix by iterative addition and more particularly to squaring and accumulating the sum of the squares of several numbers in that radix.

An object of this invention is to provide a squaring technique which is applicable to any radix, without requiring conversion to binary.

A further object is to provide a digital squarer for comparatively low speed applications which is comparatively simple and inexpensive and which can sum the squares of a plurality of successive numbers.

Other objects and advantages will appear from the following description of an example of the invention, and the novel features will be particularly pointed out in the appended claim.

Figure 1A:
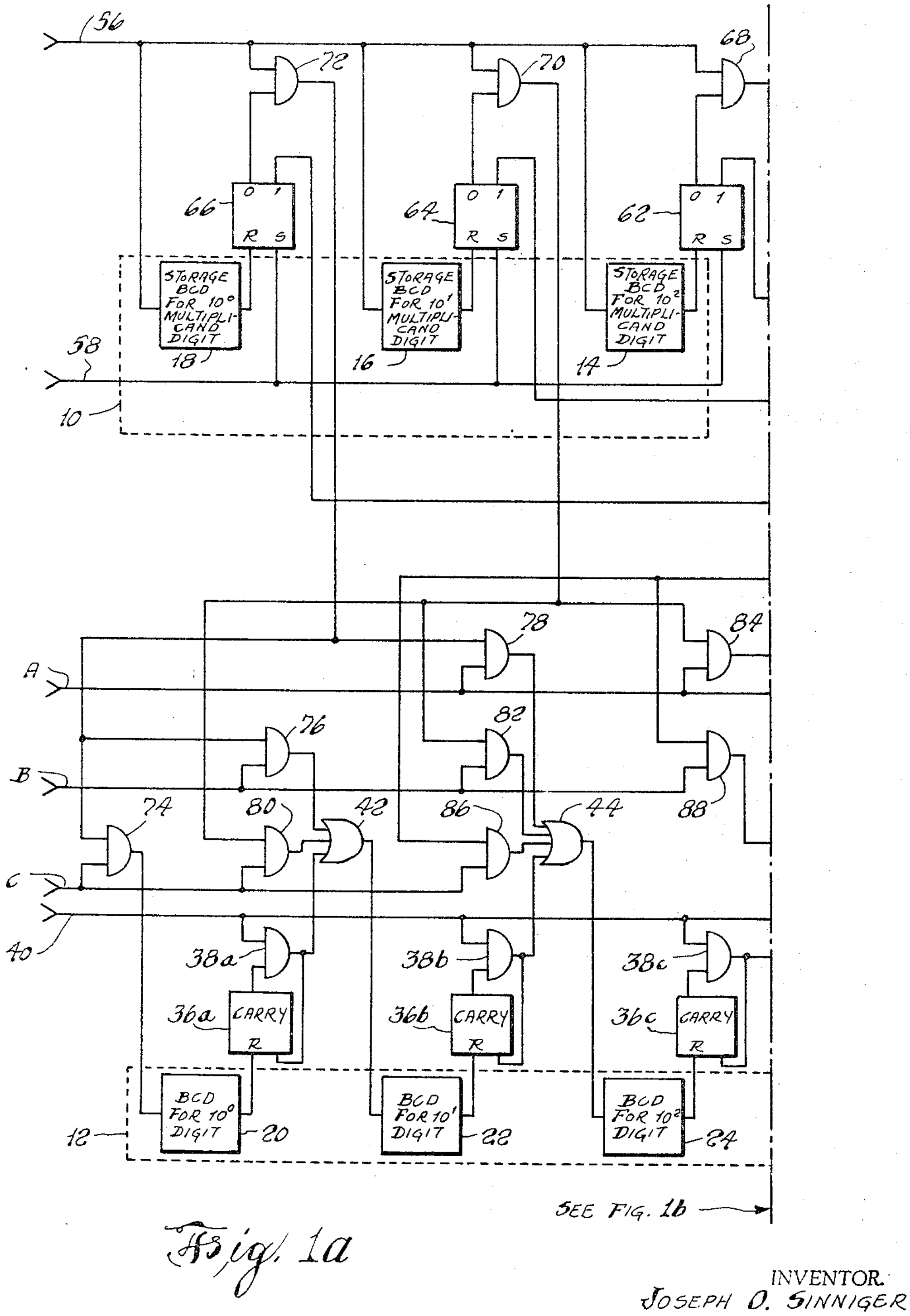
Figures 1B, 2:
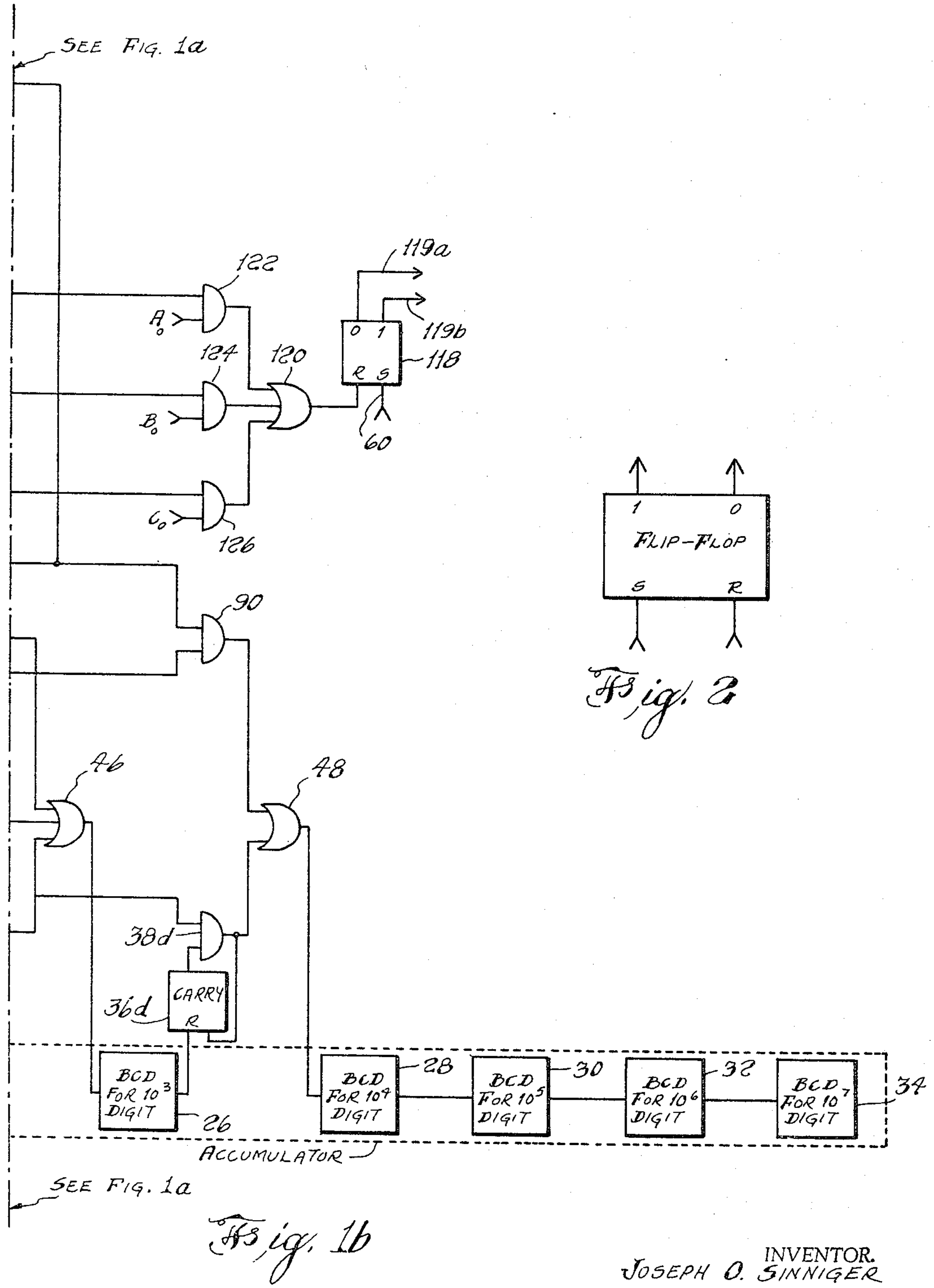
Figure 1C:
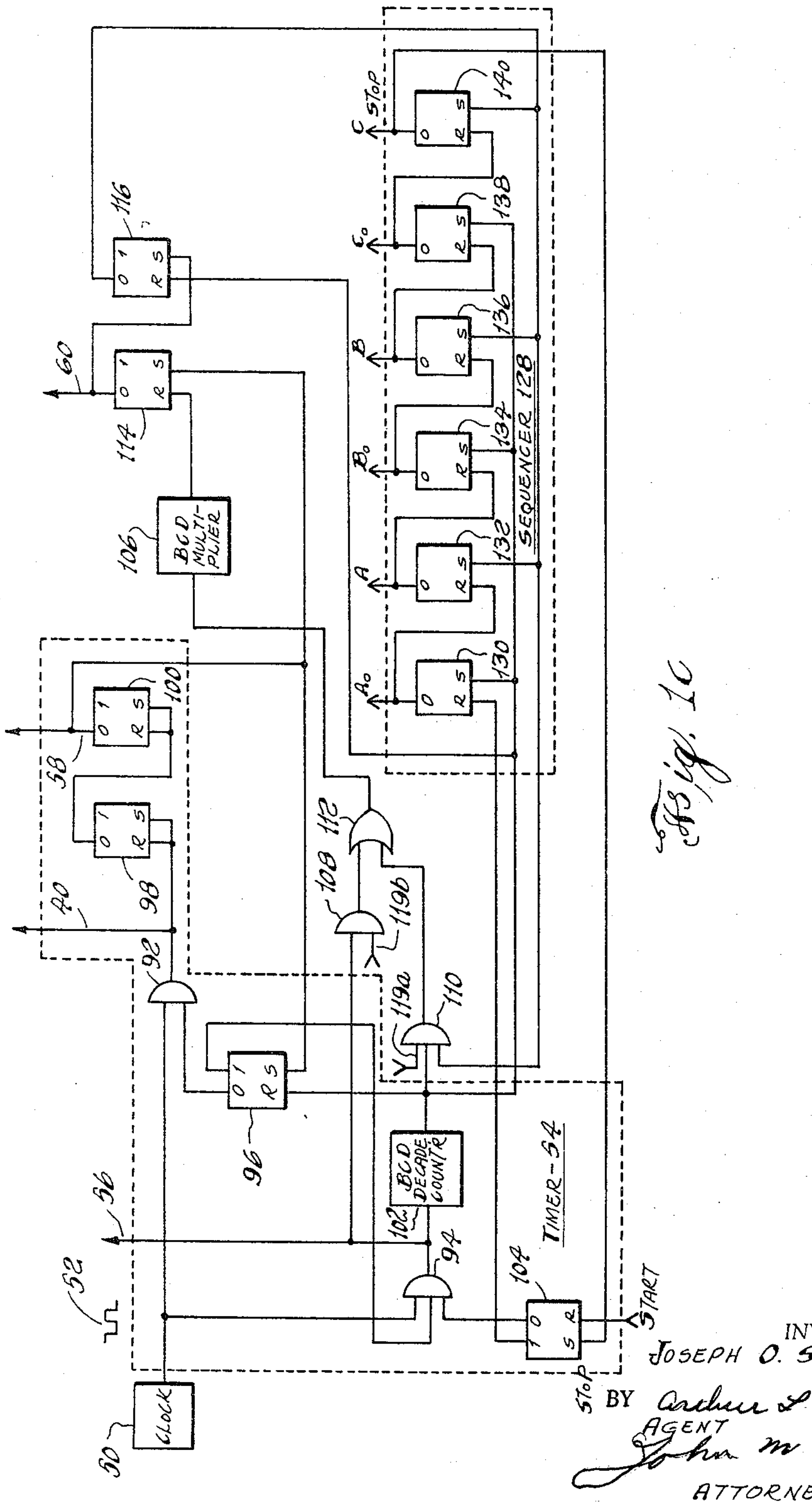

FIGS. 1*a*, 1*b*, 1*c* are portions of a circuit in accordance with this invention for squaring three digit numbers in radix 10, and FIG. 2 shows a flip-flop in block form for the purpose of describing the symbols and operational states referred in this description.

In FIGS. 1*a* and 1*b*, the disclosed embodiment includes binary coded decimal units hereinafter abbreviated BCD units to operate on numbers in radix 10; for any other radix the functional equivalent of the BCD is substituted.

The portions of the circuit shown in FIGS. 1*a* and 1*b* include a number store register 10 and an accumulator 12 each of which is comprised of a plurality of BCD units. The number store register includes three BCD units 14, 16 and 18 for storing the highest, intermediate, and lowest order multiplicand digits respectively of a three digit number to be squared. The accumulator 12 includes a series of BCD units 20, 22, 24, 26, 28, 30, 32 and 34 for the lowest order digit and for the successively higher order digits of the accumulated number.

The function of the circuitry illustrated in combination with the number store register and the accumulator is first to transmit the number stored in the BCD units 14, 16 and 18 to the BCD units 28, 26, and 24 respectively that number of times equal to the highest order digit, which is stored in BCD 14, for multiplication of the stored number by its highest ordered digit through iterative addition. Each digit is transmitted in terms of the corresponding number of pulses. The carry function is performed between successive transmittals of the number from the number store register to the accumulator. Each time BCD 28 is stepped through zero, BCD 30, coupled to the output of BCD 28, is stepped ahead one unit. After the number stored in the number store register is transmitted from BCD units 14, 16, 18 to the BCD units 28, 26, and 24 respectively, as many times as is represented by the digit stored in BCD 14, the number then is transmitted from BCD units 14, 16, 18 to the BCD units 26, 24 and 22 as many times as is represented by the digit stored in BCD 16 and lastly, the stored number is transmitted from BCD units 14, 16, 18 to the BCD units 24, 22, 20 as many times as is represented by the digit stored in BCD 18. The carry operation occurs between successive transmittals of the number. Provision for carry is needed between BCD 20 and BCD 22, between BCD 22 and BCD 24, between BCD 24 and BCD 26, and between BCD 26 and BCD 28.

The accumulator includes eight BCD units though no more than six BCD units are needed to register the square of a three digit number up to 999. The two additional BCD units may be omitted where the requirement is to square a number, read out the resultant and erase the resultant before squaring the next number. The additional BCD units provide for summing the squares of a series of numbers. One application is in RF field power measurements. Average RF power at a selected site in a selected frequency band over a given time period may be obtained from periodic voltage measurements using RF measuring means during that time period, squaring each voltage measurement and totaling the squared voltages over the given time period. The sum is subsequently divided by the number of squared voltages.

Flip-flop and flip-flops are abbreviated hereinafter as FF and FF's respectively. FF **36*a* and an AND gate 38*a* perform the carry function between BCD unit 20 and BCD unit 22. Similarly, FF's 36*b*, 36*c* and 36*d*, and AND gates 38*b*, 38*c*, 38*d* perform the carry function between BCD units 22 and 24, 24 and 26, 26 and 28. When any one or more of the FF's 36*a*, 36*b*, 36*c*, and 36*d* is switched by an output pulse from the BCD units 20, 22, 24, 26 respectively, i.e. when the BCD is stepped through zero, the corresponding AND gate(s) 38*a*, 38*b*, 38*c*, 38*d* is (are) enabled and a pulse arriving on conductor 40 passes through any of the enabled AND gates to reset the respective FF and to step the succeeding higher order BCD to its next higher digit. The carry pulses from AND gates 38*a*, 38*b*, 38*c*, 38*d* are coupled into the BCD units 22, 24, 26, and 28 respectively through OR gates 42, 44, 46, and 48 respectively, through which OR gates are transmitted also the digits of the number in the number store register. To complete the carry operation under the most extreme carry situation, namely when a carry to BCD 22 results in a carry to BCD 24, which in turn results in a carry to BCD 26 and which in turn results in a carry to BCD 28, four pulses are required on conductor 40** between successive transmittals of the number from the number store register to the accumulator. These four pulses are obtained by means shown in FIG. 1*c* and described in succeeding portions of this description. If the circuit were designed for squaring four digit numbers and required more carry units, the number of pulses for the carry operations would be increased accordingly.

A number of FF's are employed in this invention. Each FF has two inputs and two outputs as shown in FIG. 2, one or both of which are used. The two outputs have two stable states. In each of the two stable states the two outputs are complements. A change from one particular stable state to the other of the two stable states is effectuated by a change in potential in a particular direction on one particular input. A subsequent change in potential in the same direction, on the other of the two inputs changes state back again to the particular stable state mentioned above. Identifying the two flip-flop inputs as set (S) input and reset (R) input, as shown in FIG. 2, a series of changes in state are effectuated by applying a change in potential in a specific direction alternately to the two inputs. Identifying one of the outputs as a "1" output and the other output as a "0" output, in this description the S input when triggered causes the "1" output to assume the one state if previously in the zero state and the "0" to assume the zero state if previously in the "one" state and to remain in that state until the R input is triggered at which time the "1" output is reset to the zero state and the "0" output is reset to the one state. The one and zero states do not necessarily indicate relative voltage levels. Where the change in potential for triggering derives from a change in state at an output of an FF, the change required for triggering is the change from a one state to a zero state. Each AND gate coupled to an output of an FF is enabled by a one state at the output of the FF and inhibited by a zero state at the output of the FF.

In FIG. 1*c*, a clock 50 delivers a continuous train of pulses 52. A timer 54 is coupled to the clock 50 and when activated responds to successive sets of fourteen pulses to deliver at conductor 56 ten pulses corresponding to the first ten of each set of clock pulses, to deliver at conductor 40 four pulses corresponding to the next four clock pulses of each set, to deliver at conductor 58 a pulse corresponding to the fourteenth clock pulse of each set of fourteen pulses and to deliver at conductor 60 one pulse corresponding to the fourteenth clock pulse when multiplication by a digit is complete. The timer 54 operates over that number of consecutive sets of clock pulses equal to the sum of the digits of the number to be squared plus three.

The R inputs of FF's 62, 64 and 66 are coupled to the outputs of BCD units 14, 16 and 18 respectively of the number store register. The S inputs of these FF's are coupled to conductor 58 which transmits a pulse from the circuitry shown in FIG. 1*b*, as described hereinafter to set the "0" outputs of these FF's to the zero state just prior to each set of fourteen pulses. AND gates 68, 70 and 72 are connected to the "0" outputs of FF's 62, 64, and 66 and are enabled only when the "0" outputs are in the one state; the other inputs of each of these AND gates are coupled to the conductor 56. An output pulse from any of BCD units 14, 16, 18 switches the "0" outputs of the respective FF's 62, 64, and 66 to the one state. If the digits stored in one or two of the BCD units 14, 16 and 18 is zero, the corresponding FF is not switched until the tenth pulse is delivered by conductor 56. Since the eleventh through the fourteenth pulses are not transmitted on conductor 56 and since the FF's are reset following upon the fourteenth pulse, no pulses are transmitted by the respective AND gate(s) 68, 70, or 72 when the digit in the BCD is zero. Since each FF 62, 64, 66 is switched when the corresponding BCD unit 14, 16, 18 is stepped through zero, the corresponding one of AND gates 68, 70, and 72 transmits that number of the ten pulses corresponding to the digit stored in the respective BCD unit.

The output of AND gate 72 is coupled to AND gates 74, 76, and 78. The output of AND gate 70 is coupled to AND gates 80, 82 and 84. The output of AND gate 68 is coupled to AND gates 86, 88, 90. The other inputs of AND gates 74, 80, 86 are connected in common. They are enabled in coincidence when enabling (one state) voltage is on conductor C. The other inputs of AND gates 76, 82, 88 are connected in common; they are enabled in coincidence when enabling (one state) voltage is on conductor B. The other inputs of AND gates 78, 84, and 90 are connected in common. They are enabled in coincidence when enabling (one state) voltage is on conductor A. The circuit in FIG. 1*c* supplies the enabling voltages on conductors A, B, or C sequentially in the proper order and for the proper durations for the number stored in BCD units 14, 16 and 18 to be transmitted to BCD units 28, 26, and 24 respectively that number of times corresponding to the digit stored in BCD 14 and then to be transmitted to BCD units 26, 24, and 22 respectively that number of times corresponding to the digit stored in BCD unit 16, and then to be transmitted to BCD units 24, 22 and 20 that number times corresponding to the digit stored in BCD unit 18.

The timer 54 includes AND gates 92 and 94. The AND gate 92 has a second input coupled to the "0" output of FF 96; when the "0" output of FF 96 is in the one state, the AND gate 92 is enabled and transmits a pulse for each clock pulse and when the input from the FF 96 is in the zero state, the AND gate 92 is inhibited, transmitting no pulses. A pair of serially connected FF's 98 and 100 are connected to the output of AND gate 92. The "0" output of FF 100 is connected to conductor 58. When the "0" output of FF 100 is switched to the zero state, FF's 62, 64 and 66 are switched and the "0" output of FF 96 is switched from the one state to the zero state, inhibiting the AND gate 92. Four clock pulses are transmitted by the AND gate 92 from the time the "0" output of FF 96 is switched to the one state until it is switched back to the zero state. These four pulses are delivered to conductor 40.

The AND gate 94 has three inputs; clock pulses 52 are delivered continuously to one of the inputs. The AND gate 94 transmits the clock pulses only when the other two inputs are in the one state. The "1" output of FF 96 is coupled to one of the inputs of AND gate 94; one of the AND gates 92 and 94 is enabled and the other is inhibited and their operating states are changed by FF 96 at the same time. A BCD decade counter 102 is coupled to the output of AND gate 94 and generates a switching pulse in response to the tenth pulse transmitted by the AND gate 94. A switching pulse from decade counter 102 resets FF 96 to inhibit AND gate 94 and to enable AND gate 92.

An FF 104 is provided to initiate and terminate the operation of the timer 54. When the input to AND gate 94 from FF 104 is in the one state, and the input to AND gate 94 from flip-flop 96 is in the one state, the first ten out of every set of fourteen clock pulses, appear at conductor 56 and four pulses corresponding to the succeeding four clock pulses appear at conductor 40, which fourteen pulse cycle continues until the input to AND gate 94 from start stop FF 104 is switched to the zero state.

The start stop FF 104 operates to start the circuit operation when a trigger pulse is delivered to its R input e.g. from a push-button controlled single-shot pulse means, not shown. A trigger pulse to the R input of FF 104 switches its "0" output from the zero state to the one state which enables AND gate 94.

Though not shown, all units of the circuit may be cleared to start condition by conventional circuit techniques employed in the art at the same time FF 104 is switched.

Each multiplier digit in turn from the highest order digit to the lowest order digit, is stored in a scratch pad memory circuit. The scratch pad memory includes a BCD multiplier 106 in which is stored by operation of the circuit, the complement of the multiplicand digit. Then for each transmittal of the number from the number store register, the BCD multiplier 106 is stepped around one unit. It is stepped to zero when the stored number is delivered to the accumulator that number of times corresponding to the multiplicand digit. The scratch pad memory further includes two AND gates 108, 110 coupled to the inputs of OR gate 112, the output of which is connected to the input of BCD 106, two serially connected FF's 114, 116, an FF 18 in FIG. 1*b* whose "0" output is coupled by conductor 119*a* to one input of AND gate 110 and whose "1" output is coupled by conductor 119*b* to one input of AND gate 108 for alternately enabling and inhibiting AND gates 108 and 110, an OR gate 120 for coupling the outputs of AND gates 122, 124 and 126 to FF 118, one input of each AND gate 122, 124 and 126 being coupled to the "1" outputs respectively of FF's 62, 64, 66.

When the AND gate 108 is enabled and AND gate 110 is inhibited, that number of pulses complementary to the multiplicand digit are delivered to BCD 106. When AND gate 110 is enabled and AND gate 108 is inhibited, a pulse is delivered to BCD 106 following each ten pulses to BCD decade counter 102 until AND gate 110 is inhibited by a zero output from FF 118.

A sequencer 128 controls the transmittal of the multiplicand digits to the scratch pad memory and controls the transmittal of the number from the number store register to the correct BCD units of the accumulator. The sequencer includes six serially connected FF's 130, 132, 134, 136, 138, and 140. The "0" outputs of FF's 130, 134 and 138 are coupled by conductors $A_0$, $B_0$, $C_0$ to the other inputs of AND gates 122, 124, and 126. The "0" outputs of FF's 132, 136, and 140 are coupled to conductors A, B, C in FIG. 1*a*. The S inputs of FF's 130, 134, and 138 are triggered in coincidence by an output pulse of BCD 102 at which time the output of any of them in the one state is switched to the zero state; the switched FF in turn switches the ouput of the succeeding one of the FF's 132, 136 and 140 from the zero state to the one state. The S inputs of FF's 132, 136 and 140 are triggered in coincidence when the output of FF 116 switches from the one state to the zero state; the switched FF in turn switches the succeeding one of the FF's 134 and 138 or the start-stop FF 104.

Before the start of a squaring operation normally all of the FF's have been set by the preceding operation, with the "0" output in zero state and the "1" output in the one state. Since the "0" output of FF 96 is in the zero state, the AND gate 92 is inhibited and since the "1" output of FF 96 is in the one state the AND gate 94 is enabled when flip-flop 104 is switched on. While FF 118 continues in set condition, i.e. with its "0" output in zero state and its "1" output in one state, the AND gate 108 connected to its "1" output is enabled and the AND gate 110 connected to its "0" output is disabled.

When the number to be squared is in the number store register and FF 104 is switched, AND gate 94 is enabled and the output of FF 130 of the sequencer is switched to the one state thereby enabling AND gate 122. Ten pulses are delivered to conductor 56 before BCD decade counter 102 switches FF's 96 and 130 inhibiting AND gates 94 and 122. If the digit stored in BCD 14 is any number from 1 through 9, inclusive, BCD 14 delivers an output pulse for switching FF 118 when that number of pulses delivered to BCD 14 is equal to the complement of the number stored in BCD 14. Thus the complement of the digit in BCD 14 has been stored in BCD multiplier 106 when BCD 14 delivers an output pulse that switches the "1" output of FF 62 to the zero state in turn switching FF 118 thereby inhibiting AND gate 108 and delivering enabling voltage to one of the inputs of AND gate 110.

Because the input of AND gate 110 from FF 116 continues in the zero state, AND gate 110 continues inhibited. When ten pulses are delivered to conductor 56, BCD units 14, 16 and 18 are stepped back around to the original number. During the delivery of the ten pulses FF's 64 and 66 also are switched but because AND gates 124 and 126 are inhibited, have no effect. BCD decade counter 102 delivers a switching pulse in response to the tenth pulse for switching FF's 96, 116 and 130. When FF 130 is switched, AND gate 122 is inhibited and FF 132 is switched to the one state delivering enabling voltage to conductor A. When FF 96 is switched, AND gate 94 is inhibited and AND gate 92 is enabled. The output of FF 116 is switched to the one state enabling AND gate 110. The eleventh through fourteenth clock pulses are delivered to conductor 40 enabling the carry AND gates 38*a*, 38*b*, 38*c* and 38*d*. Also these pulses switch FF's 98 and 100; in response to the fourteenth pulse, the output of FF 100 is switched from the one state to the zero state setting FF 96 and the three FF's 62, 64, and 66 which are coupled to the number store register. AND gate 92 is inhibited and AND gate 94 is enabled. AND gates 78, 84 and 90 continued to be enabled. During the next ten pulses, as BCD units 14, 16 and 18 are stepped around each of the FF's 62, 64, 66 are switched when that number of pulses is delivered by conductor 56 which is the complement of the digit in the associated BCD unit; the remainder of the ten pulses subsequent to switching of FF's 62, 64, 66 is equal to the digits in the respective BCD units 14, 16, 18 and these pulses are delivered to the accumulator whereby the number in BCD units 14, 16 and 18 is delivered to BCD storage units 28, 26, and 24. In response to the tenth pulse BCD decade counter 102 delivers a pulse; scratch pad memory BCD 106 is stepped one unit and FF 96 is switched. The next four pulses are delivered to conductor 40 but are without effect, there being no carry following the first transmittal of the number to the accumulator. FF 100 delivers its switching pulse in response to the fourteenth pulse. The previously described operation is repeated. If the BCD unit 28 of the number store register is stepped through zero by the second transmittal of the stored number, the BCD unit 30 is stepped to one. If either or both of the BCD units 24 and 26 are stepped through zero during the second transmittal the carry operation(s) is (are) performed during the eleventh and twelfth pulses.

When BCD 106 is stepped to zero by a pulse from BCD decade counter 102 the number in the number store register has been transmitted to the accumulator that number of times represented by the multiplicand digit, i.e. the digit in BCD 14. BCD 106 delivers a switching pulse to FF 114 switching its output from the zero state to one state. The output of FF 116 continues in the one state having been switched by a previous pulse from BCD 102. The eleventh through fourteenth pulses are delivered by conductor 40 to the carry means and to serially connected FF's 98 and 100. In response to the fourteenth pulse the output of FF 100 is switched from the one state to the zero state which in turn sets FF 96 and switches the output of FF 114 from the one state to the zero state. The outputs of FF 118 are switched and the output of FF 116 is switched from the one state to the zero state in response to the switching of the output of FF 114 from the one state to the zero state. In response to the switching of FF 116 from the one state to the zero state, the output of FF 132 is switched from the one state to the zero state and in response to the latter the output of FF 134 is switched from the zero state to the one state. AND gates 78, 84, 90 are inhibited when the output of FF 132 is in zero state and AND gate 108 is enabled when the "1" output of FF 118 is in the one state.

If the digit in BCD 14 is zero instead of a number between one and nine inclusive, BCD 14 is stepped from zero completely around and back to zero by the ten pulses one conducter 56. In response to the tenth pulse BCD 14 switches FF 62 which in turn switches FF 118. Since the eleventh through fourteenth pulses are not delivered to conductor 56, AND gate 68 delivers no pulses to the accumulator after FF 62 is switched. The ten pulses also pass through AND gate 108 to scratch pad memory BCD 106 before FF 118 is switched and inhibits AND gate 108. BCD decade counter 102 delivers an output pulse in response to the tenth pulse but this pulse does not pass through AND gate 110 because FF 116 is not switched and AND gate 110 is not enabled until after the tenth pulse. FF 96 is switched by the output pulse from BCD 102 enabling AND gate 92 and inhibiting AND gate 94. The output of FF 130 is switched to the zero state in response to the pulse delivered by BCD 102 and the output of FF 132 is switched to the one state in response to the switching of FF 130 to the zero state but no pulses are delivered to AND gates 78, 84 and 90. Because AND gate 122 is not inhibited by FF 130 prior to the switching of FF 62, FF 118 is switched and AND gate 108 is inhibited prior to the eleventh pulse. The output pulse of BCD 102 also switches the output of FF 116 from zero to one. The eleventh pulse through thirteenth pulses switch FF's 98 and 100 to the one state. In response to the fourteenth pulse FF's 98 and 100 are switched to zero. The switching of the output of FF 100 from the one state to the zero state switches FF 62, 96 and FF 114. AND gate 94 is enabled when FF 96 is switched. In response to the switching of the output of FF 114 to zero state, FF 118 is set and FF 116 is set. As the output of FF 116 is set in the zero state FF 132 is switched inhibiting AND gates 78, 84, and 90. The output of FF 134 is switched to the one state by the switching of FF 132 to the zero state whereby AND gate 124 is enabled. Therefore, if the digit in the BCD of the number store register is zero, the total effect of the operation is to step the sequencer.

When the operation begins on the second digit, AND gates 94, 108, and 124 are enabled. Until that number of pulses equal to the complement of the digit stored in BCD 16 is delivered by the clock, BCD 16, BCD 102, and BCD 106 are stepped one unit per pulse. When the pulse completing the complement is delivered, BCD 16 delivers an output pulse switching FF 64 which in turn enables AND gate 70 and switches FF 118 through AND gate 124 and OR gate 120. AND gate 70 in enabled. AND gate 108 is disabled. Following the tenth pulse BCD 102 delivers a switching pulse that steps the sequencer to provide enabling voltage to conductor B. The remainder of the operation on the second digit and the succeeding action on the third digit is the same as heretofore described for the first digit. At the end of the operation on the third digit, FF 140 is switched to the zero state by FF 116, switching FF 104. AND gate 94 is inhibited and the squaring operation is completed.

An advantage of operating with the highest ordered digit first is that the circuit design is somewhat simpler.

To perform the squaring operation on numbers in another radix, BCD units are replaced by binary coded units for the selected radix. The circuit described can be modified for four digit numbers by appropriate extension of the number store register, sequencer, and accumulator.

The number of pulses per set is the sum of the radix number plus the number of carriers.

It will be understood that various changes in the details, materials and arrangements of parts (and steps), which have been herein described and illustrated in order to explain the nature of the invention, may be made by those skilled in the art within the principle and scope of the invention as expressed in the appended claim.

I claim:

1. A digital squarer for any number in radix 10 having up to and including three digits comprising, means for storing the digits of the number to be squared and having two inputs and operable in response to one pulse to one of the inputs followed by ten pulses to the other of the inputs to deliver the digits of the stored number, said means having three outputs for delivering the $10^0$, $10^1$, and $10^2$ digits of the stored number and having three other outputs for delivering complements of the stored digits, a clock that delivers a continuous train of pulses, means connected to the clock having one input for activation pulses and another input for deactivation pulses, and having an output coupled to said ten-pulse input of the storage means for delivering between activation and deactivation pulses corresponding to the first ten of each successive fourteen clock pulses, and having a second output for delivering one pulse corresponding to the tenth pulse of each successive fourteen clock pulses, and having a third output for delivering four pulses corresponding to the eleventh through fourteenth pulses of each successive fourteen clock pulses, and having a fourth output coupled to said one pulse input of the storage means for delivering one pulse corresponding to the fourteenth pulse of each successive fourteen clock pulses, an accumulator having six inputs for $10^0$ through the $10^5$ digits, means coupled to the digit delivering outputs of the digit storing means and to the accumulator for delivering the stored digits to selected inputs of the accumulator, a scratch pad memory having inputs coupled to the three complement delivering outputs of the digit storing means, the ten pulse output, the tenth pulse output and fourteenth pulse output of the means connected to the clock, and having three inputs for sequencing control, and operable for controlling delivery of the stored number by said delivery means to the $10^0$, $10^1$, and $10^2$ inputs of the accumulator that many times corresponding to the $10^0$ digit of the stored number, and for delivery to the $10^1$, $10^2$, and $10^3$ inputs that many times corresponding to the $10^1$ digit of the stored number, and for delivery to the $10^2$, $10^3$, and $10^4$ inputs that many times corresponding to the $10^2$ digit, and for carry between deliveries of the stored number to the accumulator, and a sequencer responsive to activation of the means coupled to the clock for controlling delivery of the complement of each stored digit to the scratch pad memory and the number delivery means and for deactivating the means coupled to the clock after the stored number is delivered to the accumulator that many times corresponding to the sum of the stored digits and carry is complete.

References Cited

UNITED STATES PATENTS

| | | | |
|---|---|---|---|
| 3,081,031 | 3/1963 | Livesay | 235—160 |
| 3,159,739 | 12/1964 | Deerfield | 235—164 |
| 3,161,764 | 12/1964 | Croy | 235—160 |

MALCOLM A. MORRISON, *Primary Examiner.*

V. SIBER, *Assistant Examiner.*